United States Patent [19]
Lim

[11] Patent Number: 5,548,196
[45] Date of Patent: Aug. 20, 1996

[54] SWITCHED RELUCTANCE MOTOR DRIVING CIRCUIT

[75] Inventor: Jun Y. Lim, Seoul, Rep. of Korea

[73] Assignee: Goldstar Co., Ltd., Seoul, Rep. of Korea

[21] Appl. No.: 204,863

[22] Filed: Feb. 28, 1994

[30] Foreign Application Priority Data

Feb. 27, 1993 [KR] Rep. of Korea ................. 93-2876
Jan. 18, 1994 [KR] Rep. of Korea ................. 94-843

[51] Int. Cl.$^6$ ........................... H02P 7/05; H02K 37/02
[52] U.S. Cl. ........................... 318/701; 318/254
[58] Field of Search ................... 318/701, 254, 318/685, 696, 138, 439

[56] References Cited

U.S. PATENT DOCUMENTS 5,075,610  12/1991  Harris ............... 318/701
5,115,181   5/1992  Sood ................ 318/701
5,424,624   6/1995  Senak, Jr. .......... 318/701

FOREIGN PATENT DOCUMENTS 4406546  2/1994  Germany.
1597486  3/1977  United Kingdom.
2159672  5/1984  United Kingdom.

OTHER PUBLICATIONS

"Modified C–Dump Converter for Variable–Reluctance Machines", by A. Hava, V. Blasko and T. Lipo, IEEE Transactions on Industry Applications. vol. 28, No. 5, Sep./Oct. 1992.

Primary Examiner—Bentsu Ro
Attorney, Agent, or Firm—Poms, Smith, Lande & Rose, P.C.

[57] ABSTRACT

A switched reluctance motor driving circuit, by which energy can be used efficiently, the inverse-phase braking is possible, and the torque ripple can be controlled through the change of the current shape. The driving circuit comprises a first switching section for switching by receiving a predetermined electric signal, a magnetic flux generating section for generating the magnetic flux according to the operation of the first switching section, a diode array for transmitting the excitation current which flows through the magnetic flux generating means in one direction, a first energy storing section for storing the excitation current which passed through the diode array as electric energy, an energy conversion section for receiving the electric energy stored in the first energy storing section converting it to magnetic energy, a second switching section for controlling the action of the energy conversion section, a second energy storing section for storing the output of the energy conversion section as electric energy, a frequency conversion section for controlling the switching action of the second switching section, a control section for receiving a predetermined electric signal to generate a switching signal, a third switching section for switching according to the switching signal outputted from the control section, and an inverse-flow preventing section for preventing the energy of the first energy storing section from flowing inversely when the third switching section operates.

19 Claims, 14 Drawing Sheets

FIG. 2H
PRIOR ART
(a) 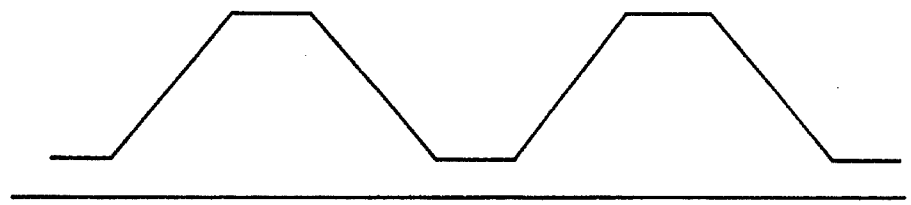
(b) 
(c) 
(d) 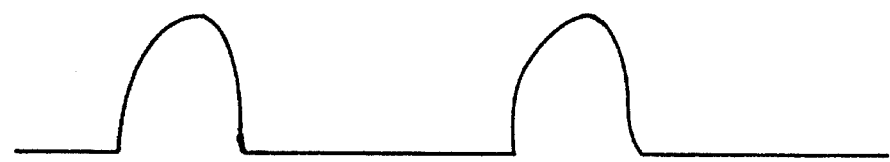

FIG. 21
PRIOR ART
(a) 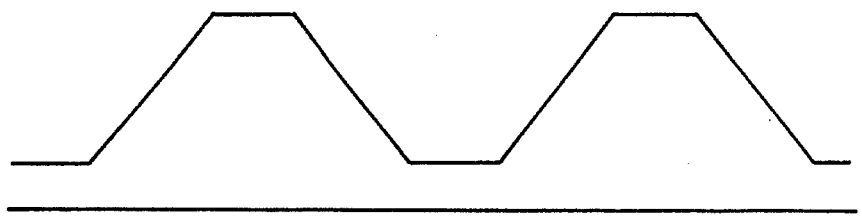
(b) 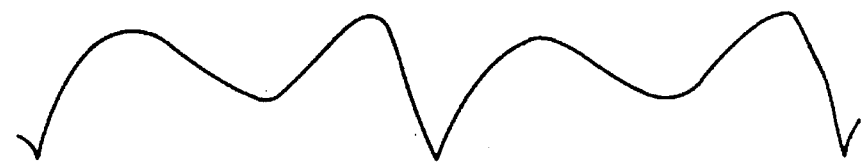
(c) 
(d) 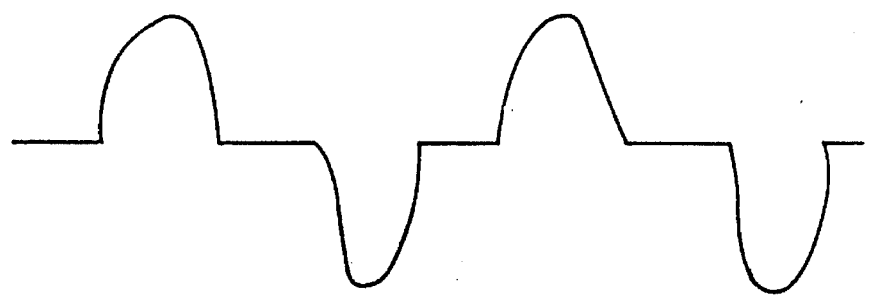

BRAKE POINT

FIG. 10
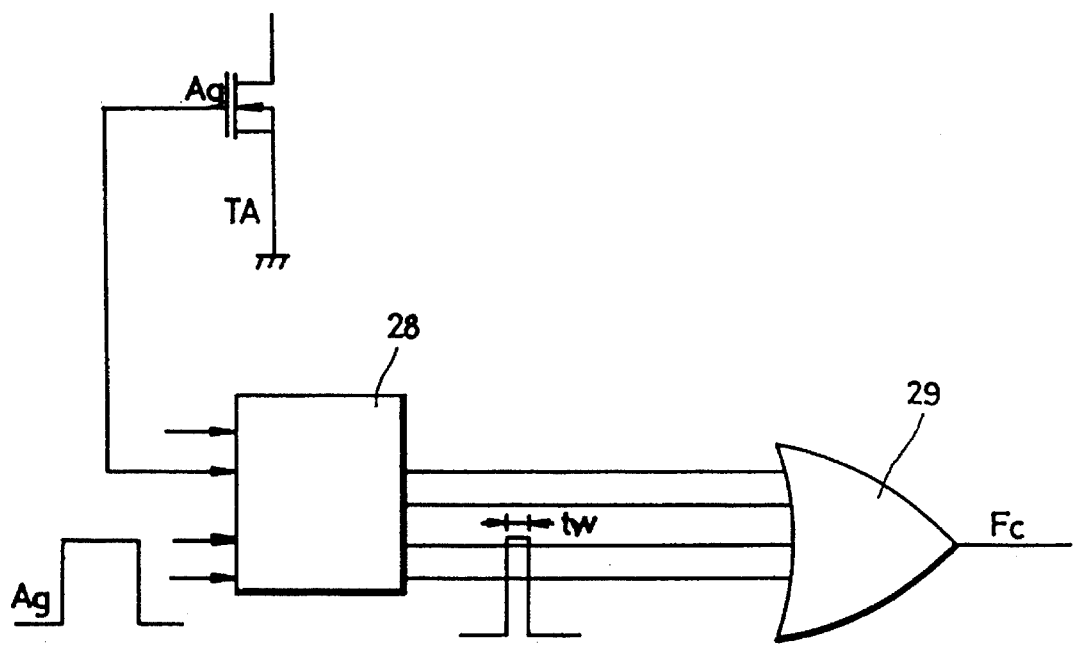
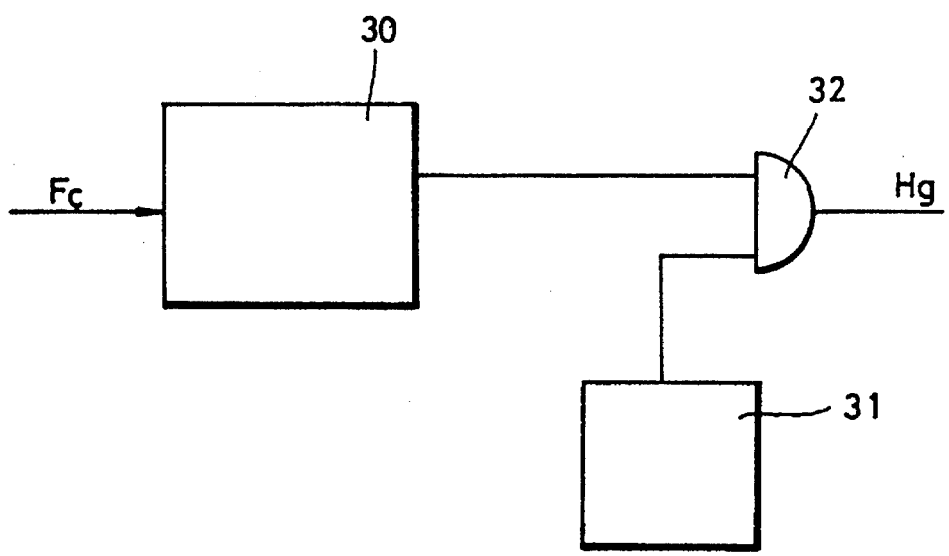

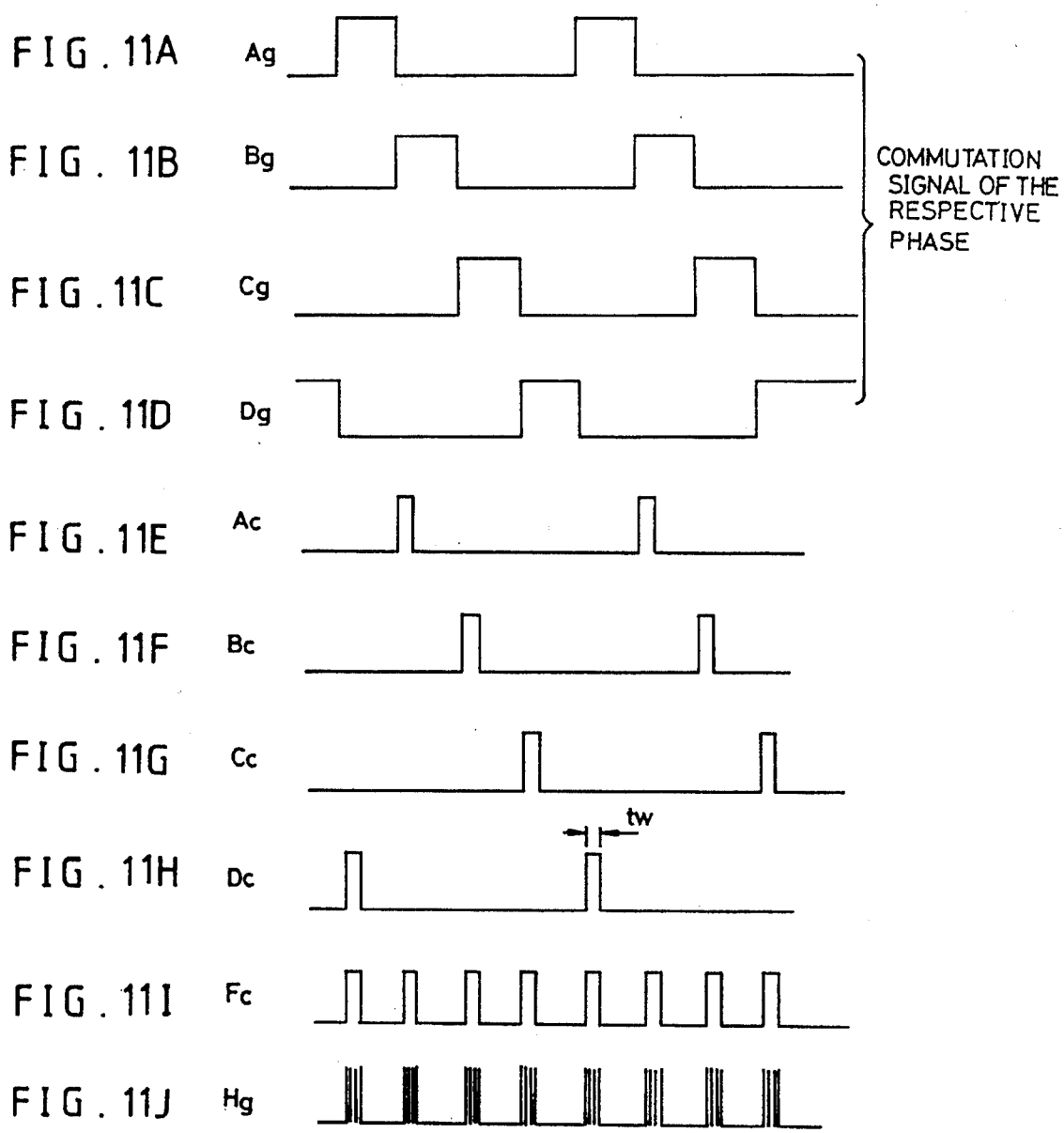

SWITCHED RELUCTANCE MOTOR DRIVING CIRCUIT

BACKGROUND OF THE INVENTION

1. Technical Field

The present invention relates to a switched reluctance motor (SRM), and more particularly to a SRM driving circuit.

2. Prior Art

FIG. 1 shows a construction of a stator and a rotor of a general SRM, in which coils 4,5,6 are wound on poles 1,2,3 of the stator, and if the magnetic flux is generated by applying phase excitation signals to the coils 4,5,6, the rotor 7 is rotated.

FIGS. 2A to 2E show several conventional 3-phase SRM driving circuits, including an R-dump circuit shown in FIG. 2A, a q+1 circuit in FIG. 2B, a C-dump circuit in FIG. 2C, a nonsymmetrical bridge circuit in FIG. 2D, and a bifilar winding circuit in FIG. 2E. In the conventional 3-phase SRM driving circuits, if phase excitation signal is applied to the coils 4,5,6 with a predetermined phase difference, the SRM is driven, and the magnetic energy of the coils 4,5,6 is returned to the main power source. Hereinafter, the operation of the conventional SRM driving circuit will be described, mainly referring to the R-dump circuit in FIG. 2A.

The conventional R-dump circuit comprises coils 4,5,6 interconnected in parallel, switching sections $T_1$, $T_2$, $T_3$ for switching the excitation current passed through the coils 4,5,6 by controlling the phase excitation signal, diodes $D_1, D_2, D_3$ respectively connected to the coils 4,5,6, resistors $R_1, R_2, R_3$ respectively connected to the diodes $D_1, D_2, D_3$, and a condenser $C_1$ for accumulating the current passing through the resistors $R_1, R_2, R_3$, in which if the magnetic flux is generated by controlling the phase excitation signal, the rotor 7 of the SRM is rotated, and the operation of which will be described hereinafter in detail.

First, if the main power is applied, a first phase excitation signal Sa is applied to the transistor of the switching section $T_1$, by which the transistor is turned on, and then a current passes through the coil 4 and the magnetic flux is generated.

After the above process, if the switching section $T_1$ is turned off by stopping to supply the first phase excitation signal Sa and the switching section $T_2$ is turned on by applying a second phase excitation signal Sb to the switching section $T_2$, the excitation current, which was, stared at the coil 4 as magnetic energy, flows through the diode $D_1$ and the resistor $R_1$ to the condenser $C_1$ to be stored therein as electric energy, and a current passes through the coil 5, so that magnetic flux is generated.

Further, if the switching section $T_2$ is turned off by stopping to supply the second phase excitation signal Sb and the switching section $T_3$ is turned on by applying a third phase excitation signal Sc to the switching section $T_3$, the excitation current stored at the coil 5 as magnetic energy flows through the diode $D_2$ and the resistor $R_2$ to the condenser $C_1$ to be stored therein as electric energy, and a current passes through the coil 6, so that the magnetic flux is generated. As is known by the above description, in the conventional SRM driving circuit, the magnetic energy stored at the coils 4,5,6 is stored at the condenser $C_1$ as electric energy by performing the above-described operations continuously and repeatedly.

Meanwhile, in the q+1 circuit shown in FIG. 2B, the resistors $R_1, R_2, R_3$ in the R-dump circuit are absent and a switching section $T_4$, which is for chopping, is connected between the main power Vdc and the coils 4,5,6. In the C-dump circuit shown in FIG. 2C, the phase excitation current of the R-dump circuit in FIG. 2A is first stored at a condenser Cd as electric energy, and then the electric energy can be stored at the condenser $C_1$ through a coil Ld by switching of the switching section Ts. In the nonsymmetrical bridge circuit in FIG. 2D, switching sections $T_4, T_5, T_8$ are respectively connected between the main power Vdc and the coils 4,5,6, and the phase excitation current is stored at the condenser $C_1$ as electric energy through the diodes $D_1, D_2, D_3$. In the bifilar winding circuit in FIG. 2E, the coils 4,5,6 induce the phase excitation current by inductive coupling circuits $L_1, L_2, L_3$, and the phase excitation current induced is returned to the condenser $C_1$ through diodes $D_4, D_5, D_6$, which form the discharging path of the phase excitation current.

However, the loss of energy is too large in the R-dump circuit, the space efficiency of the switching section $T_4$ is low and the high speed operation is restricted due to the mutual inductance in the q+1 circuit, and the high speed operation of the C-dump circuit is disadvantageous.

Further, the manufacturing cost of the nonsymmentrical bridge circuit is very expensive, and the volume of the motor of the bifilar winding circuit is too large and its manufacture is difficult.

Generally, in case there is no phase difference in an SRM, in other words, when the poles 1,2,3 of the stator coincide with the protrusions of the rotor 7, the inductance of the coils 4,5,6 are maximized, while in case the phase difference between the poles 1,2,3 of the stator and the protrusions of the rotor 7 is 45°, the inductance of the coils is minimized.

In a general SRM, the excitation is initiated when the phase difference is 45°, that is when the inductance of the coils is starting to increase. If the excitation is initiated when the inductance of the coils decreases, the motor is braked.

FIG. 2F and FIG. 2G show two conventional 4-phase SRM driving circuits. In the 4-phase SRM driving circuit in FIG. 2F, pairs of N-MOS transistors $(M_1,M_2)$, $(M_3,M_4)$, $(M_5,M_6)$, $(M_7,M_8)$ are respectively interconnected in series, the coils 4,5,6,8 are respectively connected between the sources of the first N-MOS transistors $M_1,M_3,M_5,M_7$ and the drains of the second N-MOS transistors $M_2,M_4,M_6,M_8$, the cathodes of first diodes $D_8,D_{10},D_{12},D_{14}$ are connected to the sources of the first N-MOS transistors $M_1,M_3,M_5,M_7$, the anodes of second diodes $D_9,D_{11},D_{13},D_{15}$ are connected to the drains of the second N-MOS transistors $M_2,M_4,M_6$, $M_8$ and the cathodes of the second diodes are connected to the power source Vdc, and the drains of the first N-MOS transistors $M_1,M_3,M_5,M_7$ are also connected to the power source Vdc.

If a pulse width modulation (PWM) signal of high level is applied to the gates of a pair of N-MOS transistors $M_1,M_2$, the N-MOS transistors $M_1,M_2$ are turned on and a current flows through the coil 4.

If a pulse width modulation signal of low level is applied to the gates of N-MOS transistors $M_1,M_2$ after a predetermined time passed, the N-MOS transistors $M_1,M_2$ are turned off and a current discharging path comprised of the first diode $D_1$, the coil 4 and the second diode $D_9$ is formed.

Then, the current stored as magnetic energy at the coil 4 is starting to flow through the current discharging path, so that it decreases gradually. Therefore, the magnetic energy is stored through the current discharging path at the capacitor $C_1$, which is connected between the positive terminal and the negative terminal of the power source Vdc, as electric energy.

Further, when the inverse-phase braking is performed, more current than the applied current is returned from the coil 4 through the first and the second diodes $D_8, D_9$ to the capacitor $C_1$, and thereby the voltage is elevated. Therefore, to prevent this, the resistor R4 in series with the N-MOS transistor $M_9$ is connected between the positive terminal and the negative terminal of the power source Vdc in parallel with the capacitor $C_1$.

If large voltage is applied to the capacitor $C_1$, a signal of high level is applied to the gate of the N-MOS transistor $M_9$ so that voltage is applied to the resistor R4.

FIG. 2H shows wave forms at several sections of the circuits in FIG. 2F, in which a shows the change of the inductance of the coil 4 according to the phase Q, b shows the change of the phase current flowing through the coil 4, c shows the wave form of the phase excitation signal applied to a pair of the N-MOS transistors $M_1, M_2$, and d shows the wave form of torque.

FIG 2G shows another conventional 4-phase SRM driving circuit, in which the first diodes $D_8, D_{10}, D_{12}, D_{14}$ and the first N-MOS transistors $M_1, M_3, M_5, M_7$ of the circuit in FIG. 2F are absent.

FIG. 2I shows wave forms at several sections of the circuits in FIG. 2G, in which a shows the change of the inductance of the coil 4 according to the phase Q, b shows the change of the phase current flowing through the coil 4, c shows the wave form of the phase excitation signal applied to the N-MOS transistor M2, and d shows the wave form of torque.

In FIG. 2G and FIG. 2I, if a phase excitation signal of high level as shown in FIG. 2I a is applied to the gate of the N-MOS transistor $M_2$, the N-MOS transistor $M_2$ is turned on, thereby current is starting to flow through the coil 4 and its flow is gradually increased while the phase excitation signal is in high level.

If a phase excitation signal of low level is applied to the gate of the N-MOS transistor $M_2$ while the current increases, the N-MOS transistor $M_2$ is turned off and the current accumulated at the coil 4 as magnetic energy circulates in a closed loop through the diode $D_9$. Therefore, the current flowing through the coil 4 is changed as shown in FIG. 2I b according to the switching state of the N-MOS transistor $M_2$.

However, when the N-MOS transistor $M_2$ is in the state of turned-off, because the current saved as magnetic energy at the coil 4 circulates, the current is not decreased quickly in the closed loop comprising the coil 4 and the diode $D_9$, and thereby, because fairly large quantity of current lasts to circulate in the loop even while the inductance decreases, the SRM is braked and torque as shown in FIG. 2 d is applied to the SRM.

That is, the circuit of FIG. 2F has good driving efficiency, but it requires an overvoltage protective circuit because the voltage of the capacitor is increased when the motor is braked, while the circuit of FIG. 2G does not elevate the voltage of the capacitor when the motor is braked, but its driving efficiency and velocity are low.

SUMMARY OF THE INVENTION

It is an object of the present invention to provide an SRM driving circuit which can use energy efficiently by supplying the magnetic energy stored in the coil to the capacitor, which is between the positive terminal and the negative terminal of the power source, through various energy converting process.

It is another object of the present invention to provide an SRM driving circuit which can prevent an overvoltage from being applied to the capacitor, which is between the positive terminal and the negative terminal of the power source, when the motor is braked.

It is still another object of the present invention to provide an SRM driving circuit which can achieve the inverse-phase braking effect.

It is still another object of the present invention to provide an SRM driving circuit in which the torque ripple of the current can be minimized.

To achieve the above objects, an SRM driving circuit according to the present invention comprises:

first switching means for performing switching operation by receiving a predetermined electric signal;

magnetic flux generating means for generating the magnetic flux according to the operation of the first switching means;

a diode array for transmitting the excitation current which flows through the magnetic flux generating means in one direction;

first energy storing means for storing the excitation current which passed through the diode array as electric energy;

energy conversion means for receiving the electric energy stored in the first energy storing means converting it to magnetic energy;

second switching means for controlling the operation of the energy conversion means; and second energy storing means for storing the output of the energy conversion means as electric energy.

Preferably, the SRM driving circuit according to the present invention may further comprises frequency modulation means for controlling the switching operation of the second switching means.

More preferably, the SRM driving circuit according to the present invention may further comprises:

control means for receiving the predetermined electric signal and generating a switching signal;

third switching means for Performing switching operation according to the switching signal outputted from the control means; and inverse-flow preventing means for preventing the energy of the first energy storing means from flowing inversely when the third switching means operates.

BRIEF DESCRIPTION OF THE DRAWING

The above object and other features and advantages of the present invention will be apparent from the following description referring to the accompanying drawings, in which:

FIGS. 2H and 2I respectively show the wave forms of the circuits shown in FIGS. 2F and 2G, FIG. 10 is a detailed view of a part of the circuit in FIG. 9, FIGS. 11A to 11J are views explaining the action of the circuit in FIG. 10,

DETAILED DESCRIPTION OF THE EMBODIMENTS

Figure 1:
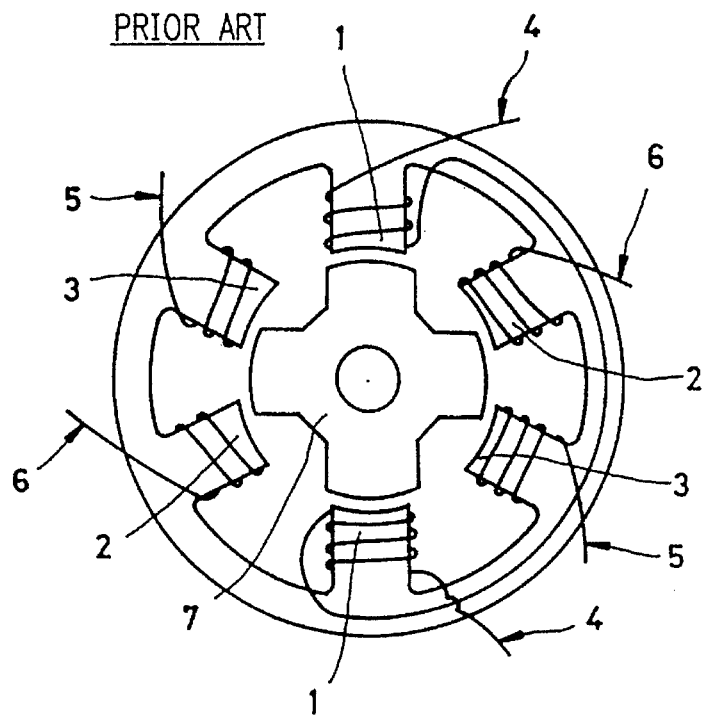
FIG. 1 shows a construction of a stator and a rotor of a general SRM.
Figure 2A:
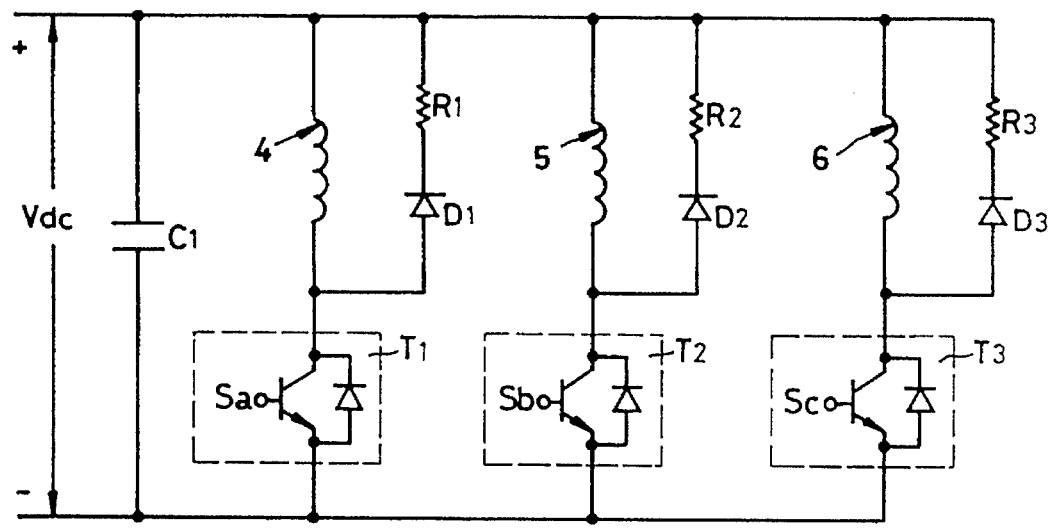
FIGS. 2A to 2G show the conventional SRM driving circuits.
Figure 2B:
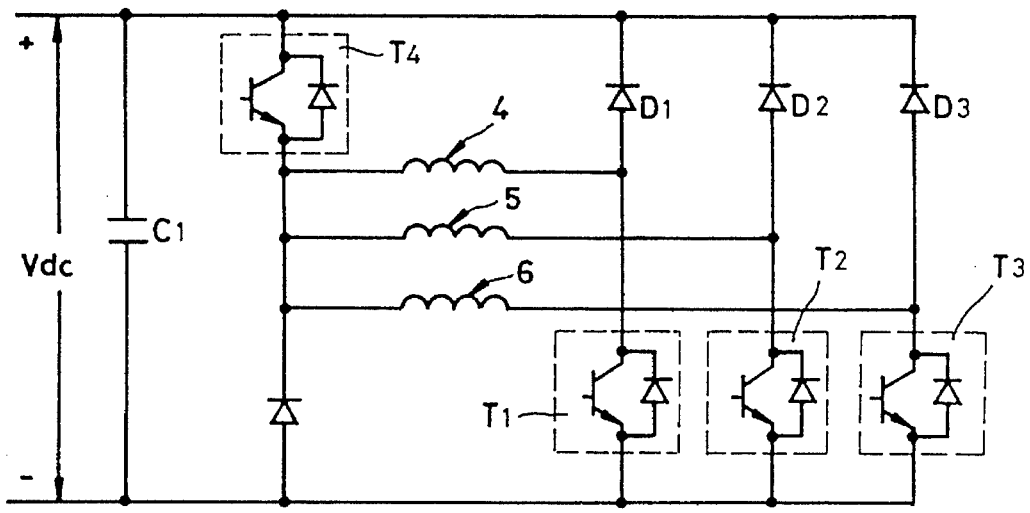
Figure 2C:
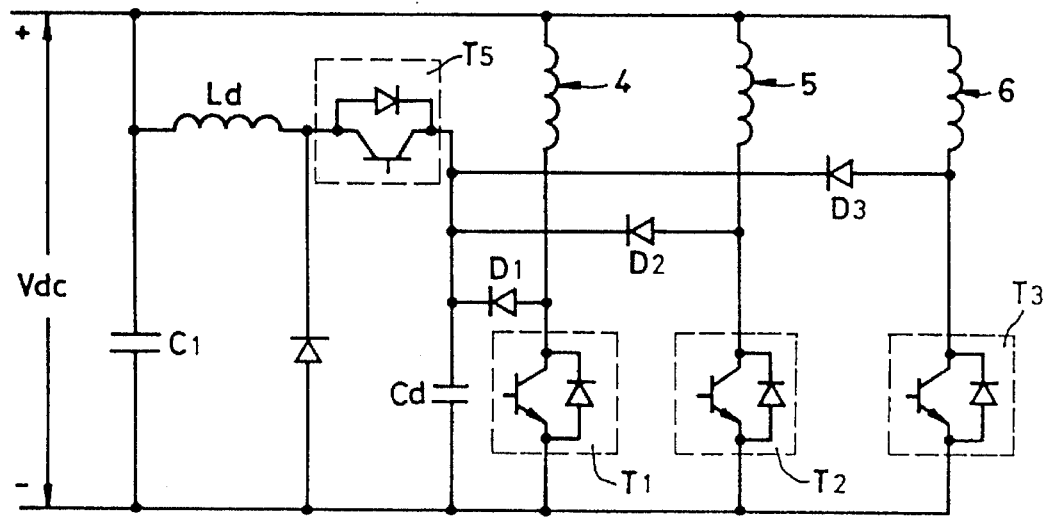
Figure 2D:
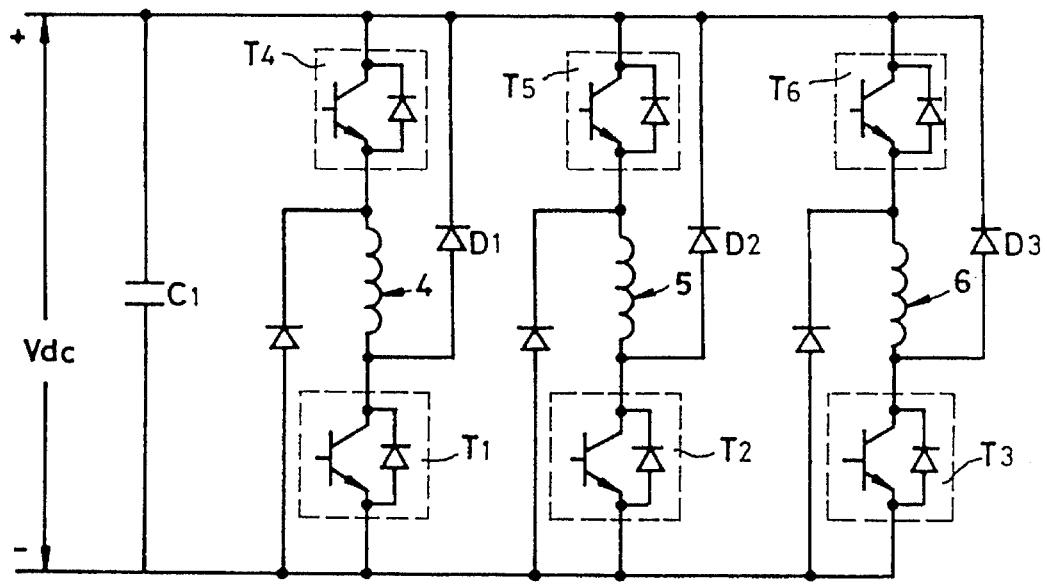
Figure 2E:
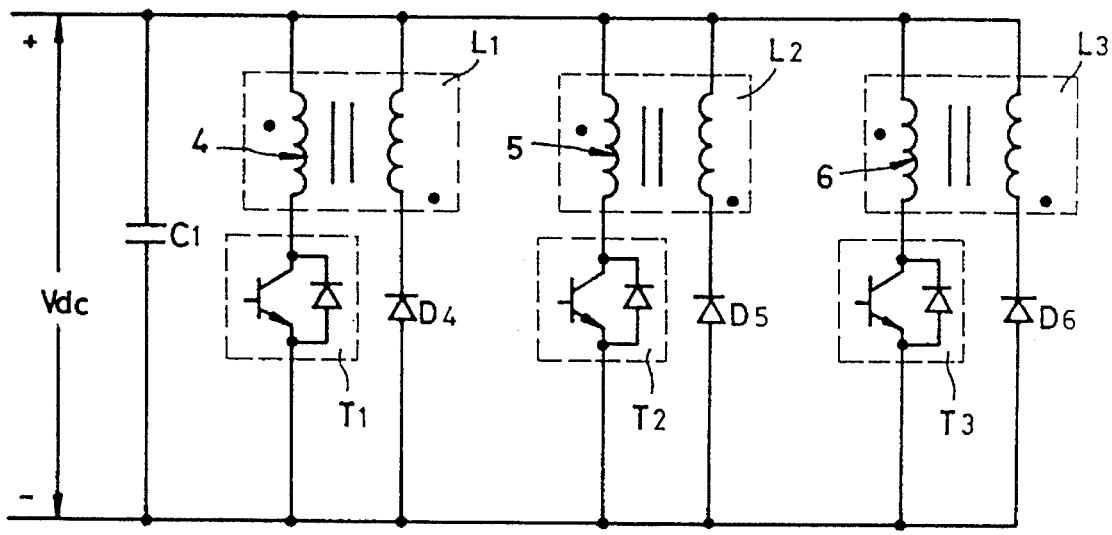
Figure 2F:
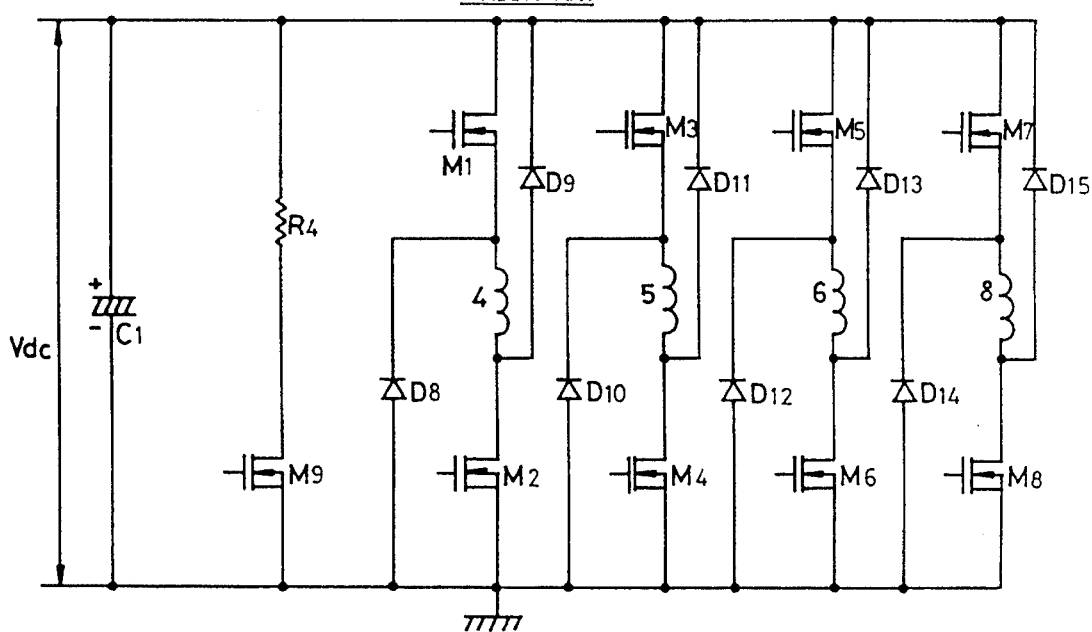
Figure 2G:
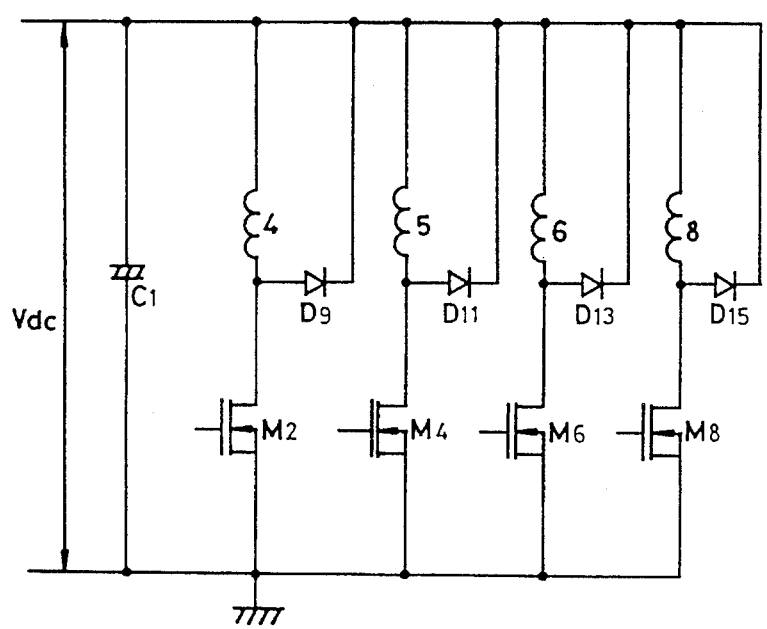
Figure 3:
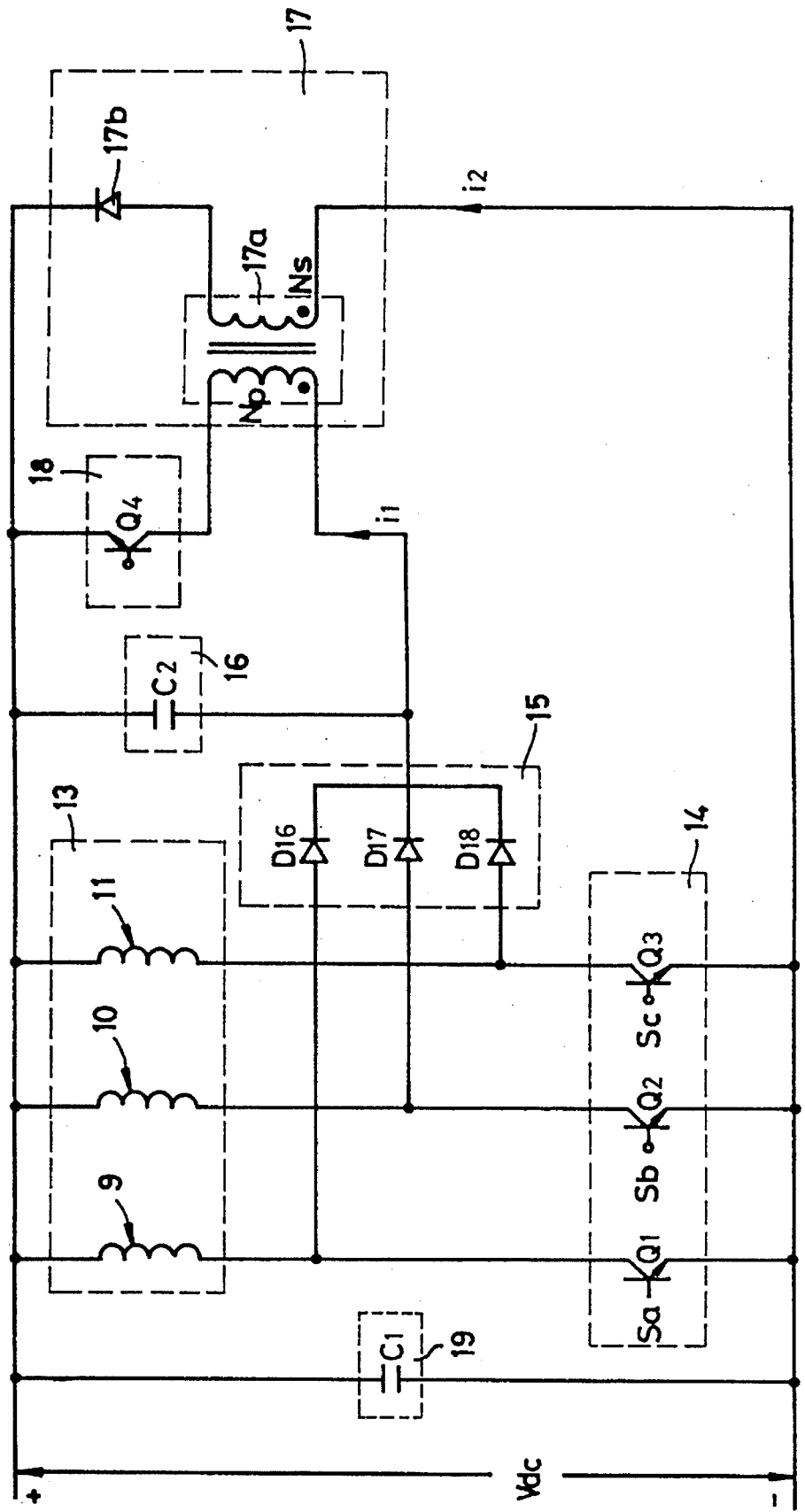
FIG. 3 shows an embodiment of an SRM driving circuit according to the present invention.

FIG. 3 is a circuit diagram of an embodiment of an SRM driving circuit according to the present invention. The SRM driving circuit shown in FIG. 3 comprises a magnetic flux generating section 13 for generating the magnetic flux according to the action of a first switching section 11 for switching by receiving a phase excitation signal, a diode array 15 for transferring the excitation current, which flows through the magnetic flux generating section 13, in one direction, a first energy storing section 16 for storing the excitation current, which passed through the diode array 15, as electric energy, an energy conversion section 17 for receiving the electric energy, which is stored in the first energy storing section 16, to convert it to magnetic energy, a second switching section 18 for controlling the action of the energy conversion section 17, and a second energy storing section 19 for storing the output of the energy conversion section 17 as electric energy.

The magnetic flux generating section 13, which comprises a plurality of coils interconnected in parallel, generates the magnetic flux to rotate the rotor of the SRM.

The magnetic flux generating section 13 of the 3-phase SRM comprises three coils 9,10,11, and that of the 4-phase SRM comprises four coils.

The first switching section 14 comprises transistors $Q_1, Q_2, Q_3$ for switching the phase excitation current, which passed the coils 9,10,11, by controlling the phase excitation signal, and the diode array 15 comprises diodes $D_{16}, D_{17}, D_{18}$, one ends of which are respectively connected to the coils 9,10,11.

Further, the first energy storing section 16 comprises a condenser $C_2$, and the energy conversion section 17 comprises a inductive coupling circuit 17a and a diode 17b.

The second switching section 18 comprises a transistor $Q_4$.

Referring to FIG. 3, if the power source Vdc is applied and then a first phase excitation signal Sa is applied to the base of the transistor $Q_1$ so that the transistor $Q_1$ is turned on, current flows through the coil 9, and thereby the magnetic flux is generated.

If the transistor $Q_1$ is turned off by stopping to supply the first phase excitation signal Sa and the transistor $Q_2$ is turned on by applying a second phase excitation signal Sb to the base of the transistor $Q_2$, the excitation current, which was stored at the coil 9 as magnetic energy, flows through the diode $D_{16}$ to the condenser $C_2$ of the second energy storing section 16 to be stored in the condenser $C_2$ as electric energy, and magnetic flux is generated because the current passes through the coil 10.

If a signal having a predetermined frequency is applied to the base of the transistor $Q_4$ during the above process, the transistor $Q_4$ is repeatedly switched according to the predetermined frequency.

Therefore, a part of energy charged in the condenser $C_2$ of the first energy storing section 16 is transferred to the first windings Np of the inductive coupling circuit 17a so as to be stored in the condenser $C_1$ as electric energy of the second energy storing section 19 through the diode 17b.

Meanwhile, if the transistor $Q_2$ is turned off by stopping to supply the second phase excitation signal Sb to the transistor $Q_2$ and the transistor $Q_3$ is turned on by applying a third phase excitation signal Sc to the base of the transistor $Q_3$, the excitation current, which was stored in the coil 10 as magnetic energy, is stored in the condenser $C_2$ as electric energy through the diode $D_{17}$, and magnetic flux is generated because the currant flows through the coil 11.

In the same way that the energy, which is stored in the condenser $C_2$ as electric energy by stopping to supply the second phase excitation signal Sb, is returned to the condenser $C_1$, the phase excitation current flowing through the windings 10, 11 is stored in the condenser $C_1$. In this case, the voltage of the charged condenser $C_2$ is dependent on the current flowing through the coils 9, 10, 11 and the number of rotations of the SRM.

Figure 4:
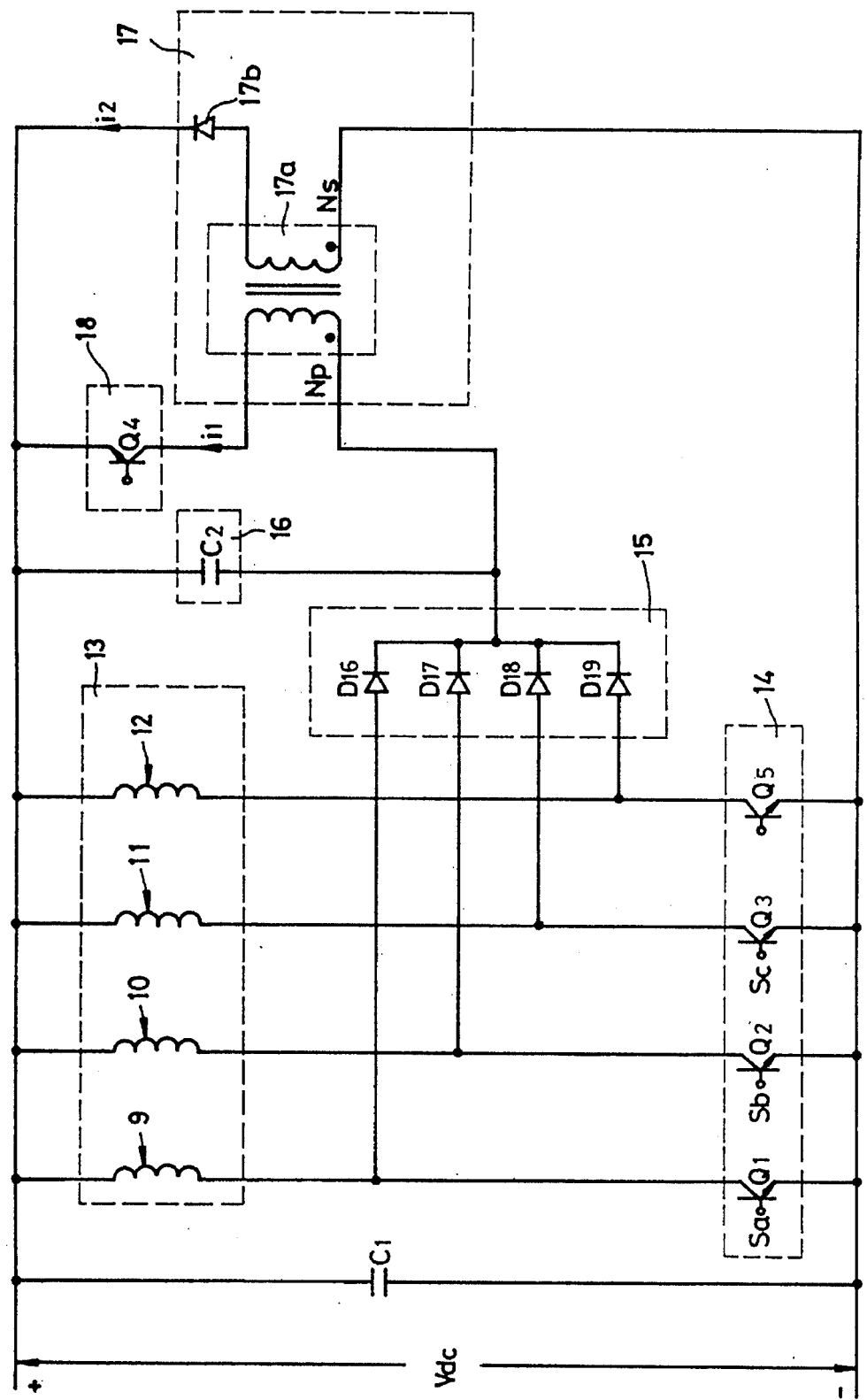
FIG. 4 shows another embodiment of an SRM driving circuit according to the present invention.

FIG. 4 shows another embodiment of the SRM driving circuit according to the present invention. Compared with the circuit in FIG. 3, the circuit in FIG. 4 further comprises a coil 12 in the magnetic flux generating section 13, a transistor $Q_5$ in the first switching section 14, and a diode $D_{19}$ in the diode array 15, which is because FIG. 3 shows a circuit for 3-phase SRM, while FIG. 4 shows a circuit for 4-phase SRM.

The action of the circuit in FIG. 4 is equal to that of the circuit in FIG. 3.

Figure 5A:
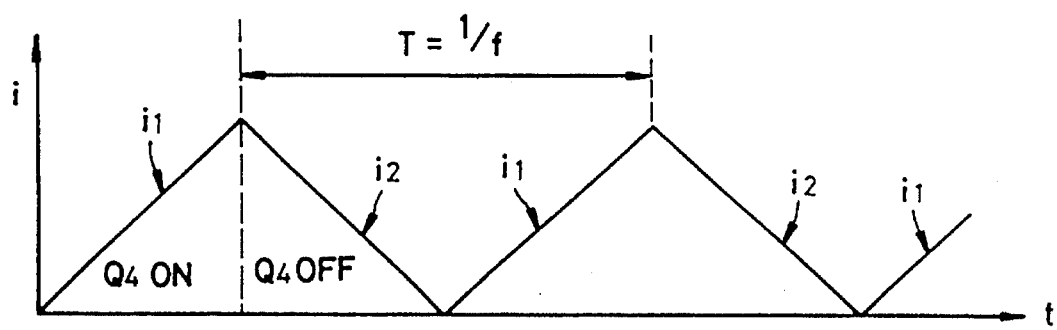
FIGS. 5A and 5B are the wave forms of currents in some sections of the circuits in FIG. 3 and FIG. 4.
Figure 5B:
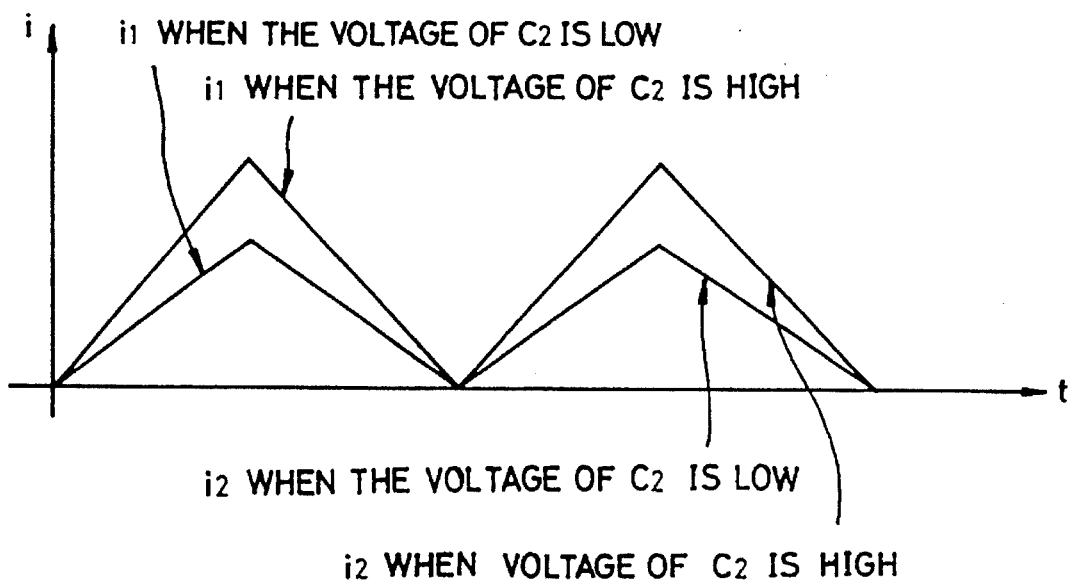

FIG. 5A shows the changes of the current $i_1$ flowing through the first windings Np and the current $i_2$ flowing through the second windings Ns of the inductive coupling circuit 17a according to the switching of the transistor $Q_4$ of the second switching section 18, while FIG. 5B shows the changes of the current $i_1$ flowing through the first windings Np and the current $i_2$ flowing through the second windings Ns of the inductive coupling circuit 17a according to the voltage of the condenser $C_2$ of the first energy storing section 16.

Referring to FIG. 5A, the current $i_1$, which flows through the first windings Np of the inductive coupling circuit 17a while the transistor $Q_4$ is being turned on, in creases with a constant slope, and if the transistor $Q_4$ is turned off, the current $i_2$ of the second windings Ns, which was induced by the magnetic energy by the current of the first windings Np while the transistor $Q_4$ was being turned on, flows through the diode 17b to the condenser $C_1$ of the first energy storing section 19.

Further, FIG. 5B shows that, the higher the voltage of the condenser $C_2$ is, the more the currents $i_1, i_2$ of the wire are.

Figure 6:
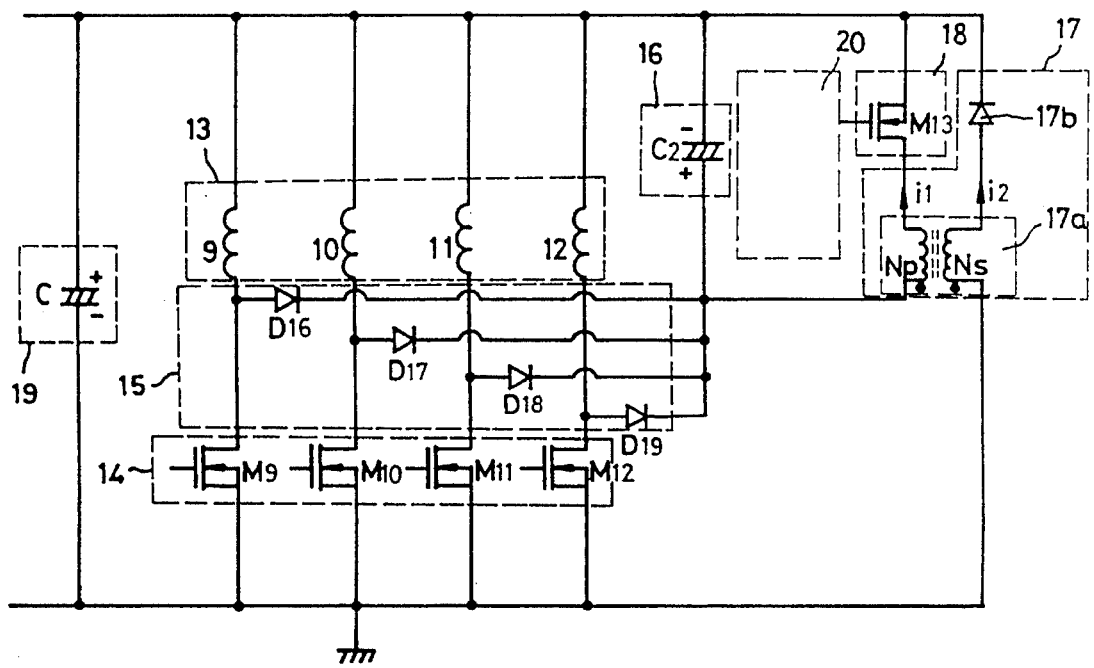
FIG. 6 shows another embodiment of an SRM driving circuit according to the present invention.

FIG. 6 shows another embodiment of the SRM driving circuit according to the present invention, which comprises a first switching section 14 for switching by receiving a phase excitation signal, a magnetic flux generating section 13 for generating magnetic flux according to the action of the first switching section 14, a diode array 15 for transferring the excitation current, which flows through the magnetic flux generating section 13, in one direction, a first energy storing section 16 for storing the excitation current, which passed through the diode array 15, as electric energy, an energy conversion section 17 for receiving the electric energy, which was stored in the first energy storing section 16, to convert it to magnetic energy, a second switching section 18 for controlling the action of the energy conversion section 17, a second energy storing section 19 for storing the output of the energy conversion section 17 as electric energy, and a frequency modulation section 20 for controlling the switching of the second switching section.

The first switching section 14 comprises four N-MOS transistors $M_9, M_{10}, M_{11}, M_{12}$, the magnetic flux generating section 13 comprises four coils 9,10,11,12, and the diode array 15 comprises four diodes $D_{16}, D_{17}, D_{18}, D_{19}$.

Further, the first energy storing section 16 comprises a condenser $C_2$, and the energy conversion section 17 comprises an inductive coupling circuit 17a and a diode 17b.

The second switching section 18 comprises a N-MOS transistor M13.

Figure 7A:
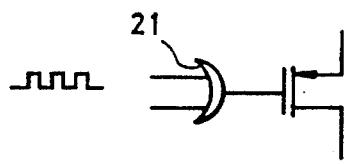
FIG. 7A and 7B are detailed views of a part of the circuit in FIG. 6, FIGS. 8A to 8F are views explaining the action of the circuit in FIG. 6.

FIG. 7 is a more detailed view of the frequency modulation section 20 shown in FIG. 6. As shown in FIG. 7A, the frequency modulation section 20 comprises an OR gate, which receives a control signal as one input and a brake signal as another input and then performs logical sum with respect to them to produce a resultant value.

Figure 7B:
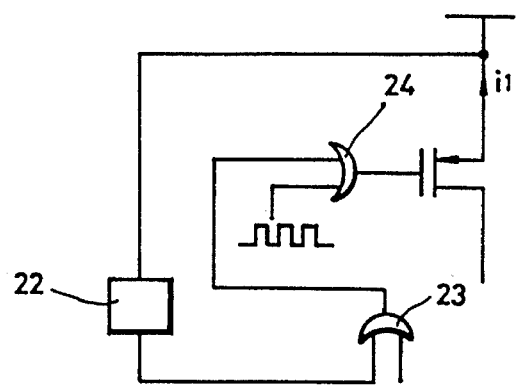

FIG. 7B shows another embodiment of the frequency modulation section 20, which comprises a comparator 22 for receiving the current flowing through the source or the drain of the N-MOS transistor M13 to compare it with a standard signal, an AND gate 23 for receiving the output of the comparator 22 as one input and a brake signal as another input to perform logical product with respect to them, and an OR gate 24 for receiving the output of the AND gate 23 as one input and a control signal as another input to perform logical sum with respect to them.

Referring to FIG. 6, if the N-MOS transistor $M_{13}$ of the second switching section 18 switches according to the output of the frequency modulation section 20, a part of the energy, which was stored in the condenser $C_2$ of the first energy storing section 16, is stored in the condenser $C_1$ of the second energy storing section 19 through the energy conversion section 17.

That is, while the brake signal, which is an input of the OR gate in FIG. 7A, is in low level, the output of the OR gate 21 is dependent on the control signal which is another input of the OR gate 21.

If the control signal is in high level, the output of the OR gate 21 is also in high level, thereby the N-MOS transistor is turned on.

While the N-MOS transistor $M_{13}$ is being turned-on, a part of energy of the condenser $C_2$ is transferred to the first windings Np of the inductive coupling circuit 17a.

Meanwhile, if the control signal is in low level, the output of the OR gate 21 is also in low level, thereby the N-MOS transistor is turned off.

While the N-MOS transistor $M_{13}$ is being turned off, the magnetic energy, which was induced from the first windings Np to the second windings Ns, is stored in the condenser $C_1$ as electric energy through the diode 17b.

In this case, if the state of the control signal, which is an input of the OR gate 21, is shifted from low level to high level, the state of the output of the OR gate 21 also becomes high level without relation to the control signal which is another input of the OR gate 21. Therefore, the N-MOS transistor $M_{13}$ maintains the 'ON' state continuously.

The energy, which was stored in the condenser $C_2$, is discharged to a closed loop which comprises the first wind-ings Np of the inductive coupling circuit 17a, N-MOS transistor, and the respective pairs of coils 9,10,11,12, and this discharged energy is stored in the respective pairs of the coils 9,10,11,12 as magnetic energy.

As a result, fairly large current flows through the respective pairs of the coils 9,10,11,12 even at the duration that the inductance decreases, and thereby the motor is braked.

In other words, if a brake signal of high level is applied at the brake point, the braking is achieved.

The frequency modulation section in FIG. 7B can detect an overcurrent flowing through the N-MOS transistor $M_{13}$ to control the N-MOS transistor $M_{13}$, so as to prevent the overcurrent from destructing the elements in the circuit by overvoltage.

Figure 8A:
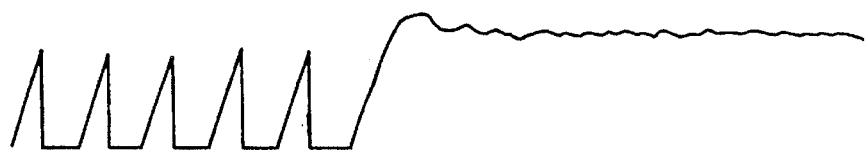
Figure 8B:
Figure 8C:
Figure 8D:
Figure 8E:
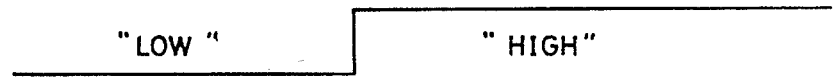
Figure 8F:
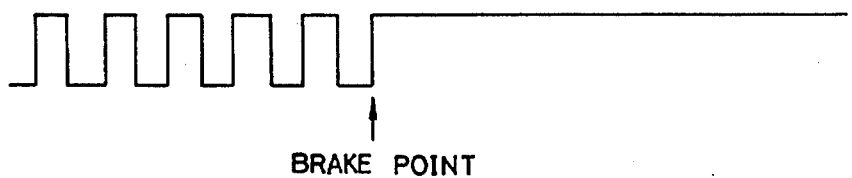

FIGS. 8A to 8F are to describe the operation of the circuit shown in FIG. 6, in which FIG. 8A shows the change of the current $i_1$ flowing through the first windings Np of the inductive coupling circuit 17a, FIG. 8B shows the change of the current $i_2$ flowing through the second windings Ns, FIG. 8C shows the change of the voltage applied to the condenser C2, FIG. 8D shows a wave form of the control signal, FIG. 8E shows the wave form of the brake signal, and FIG. 8F shows the wave form of the output signal of the OR gate 21.

While the brake signal is in low level and the control signal is in high level, the current $i_1$ flowing through the first windings Np of the inductive coupling circuit 17a increases continuously. Then, if the control signal is shifted into low level, the current flowing through the second windings decreases because the magnetic energy of the first windings Np is induced to the second windings Ns to be discharged through the diode 17b.

In this case, if a brake signal of high level is applied, the current $i_1$ flowing through the first windings Np flows constantly in a steady state after being increased continuously, and no current flows through the second windings because of no induction.

In case of applying a brake signal of high level at the brake point to brake the SRM, the quantity of the current flowing through the first windings Np of the inductive coupling circuit 17a can be fairly large. Therefore, to overcome this problem, several methods can be considered as other embodiments of the present invention; decreasing the frequency of the control signal in brake point gradually, enlarging the duty, or controlling N-MOS transistor $M_{13}$ using the current of the N-MOS transistor $M_{13}$ as shown in FIG. 7B.

Figure 9:
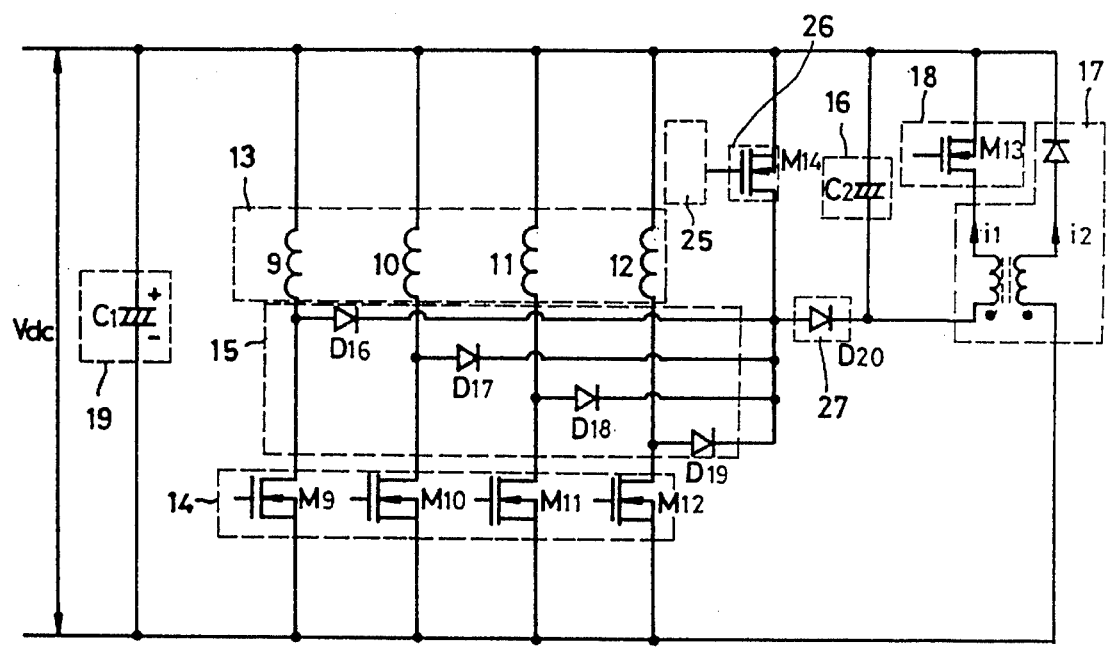
FIG. 9 shows another embodiment of an SRM driving circuit according to the present invention.

FIG. 9 shows another embodiment of the SRM driving circuit according to the present invention, which comprises a first switching section 14 for switching by receiving a phase excitation signal, a magnetic flux generating section 13 for generating magnetic flux according to the control of the first switching section 14, a diode array 15 for transferring the excitation current, which flows through the magnetic flux generating section 13, in one direction, a first energy storing section 16 for storing the excitation current, which passed through the diode array 15, as electric energy, an energy conversion section 17 for receiving the electric energy, which was stored in the first energy storing section 16, to convert it to magnetic energy, a second switching section 18 for controlling the action of the energy conversion section 17, a second energy storing section 19 for storing the output of the energy conversion section 17 as electric energy, a control section 25 for receiving the phase excitation signal to generate a switching signal, a third switching section 26 for switching according to the switching signal outputted from the control section 25, and an inverse-flow preventing section 27 for preventing the energy of the first energy storing section 16 from flowing inversely when the third switching section 26 acts.

The first switching section comprises N-MOS transistors $M_9, M_{10}, M_{11}, M_{12}$, the magnetic flux generating section 13 comprises coils 9,10,11,12 the diode array 15 comprises diodes $D_{16}, D_{17}, D_{18}, D_{19}$. The first energy storing section 16 comprises a condenser $C_2$, and the energy conversion section 17 comprises a inductive coupling circuit 17a and a diode 17b. The second switching section 18 comprises N-MOS transistor $M_{13}$, the second energy storing section 19 comprises a condenser $C_1$, the third switching section 26 comprises an N-MOS transistor $M_{14}$, and the inverse-flow preventing section 27 comprises a diode $D_{20}$.

FIG. 10 is a more detailed view of the control section 25 in FIG. 9, which comprises a descending edge detecting section 28 for receiving the respective phase excitation signal to detect its descending edge and generating a signal having a predetermined width tw at the descending edge, an OR gate 29 for receiving the output of the descending edge detecting section 28 to perform logical sum, a level shifting section 30 for levelling up the output of the OR gate 29, a PWM signal generating section 31 for generating a PWM signal, and an AND gate 32 for receiving the output of the level shifting section 30 and the output of the PWM signal generating section 31 to perform logical product with respect to them.

FIGS. 11A to 11J are to describe the action of the circuit in FIG. 10. FIG. 11A shows a first phase excitation signal, FIG. 11B shows a second phase excitation signal, FIG. 11C shows a third phase excitation signal, and FIG. 11D shows a fourth phase excitation signal.

Referring to FIG. 10 and FIGS. 11A to 11J, if the first phase excitation signal is applied to the descending edge detecting section 28 of the control section 25, the detecting section 28 generates a signal as shown in FIG. 11E, and if the second phase excitation signal is applied to the detecting section 28, the detecting section 28 generates a signal as shown in FIG. 11F.

If the third and the fourth phase excitation signals are respectively applied to the detecting section 28 in the same way, the detecting section 28 generates signals shown in FIGS. 11G and 11H in order.

The signals shown in FIGS. 11E to 11H respectively have a predetermined width.

Therefore, the OR gate 29, which received the output of the detecting section 28, generates an output shown in FIG. 11I. The output of the OR gate 29 is leveled up by the level shifting section 30 to be inputted into the AND gate 32. The level shifting section 30 maybe a photo coupler, a pulse transformer, or a level shifter.

The PWM signal generating section 31 generates a PWM signal, the width of which is narrower than that of the output signal of the OR gate 29, to supply it for another input of the AND gate 32.

The AND gate 32 receives the output of the level shifting section 30 and the output of the PWM signal generating section 31 to perform logical product with respect to them, so as to output a signal as shown in FIG. 11J.

The output of the AND gate 32 is provided for the input of the third switching section 26.

The operation of the circuit shown in FIG. 9 will be described hereinafter.

If the first phase excitation signal of high level as shown in FIG. 11A is applied to the N-MOS transistor $M_9$, the N-MOS transistor $M_9$ is turned on, and then current flows through the coil 9.

If the first phase excitation signal is shifted from high level state to low level state, the second phase excitation signal of high level as shown in FIG. 11B is applied to the N-MOS transistor M10, and there by the N-MOS transistor is turned on.

In this case, the output Hg of the control section 25 by the first phase excitation signal is applied to the gate of the N-MOS transistor $M_{14}$ of the third switching section 26.

While the first phase excitation signal is in high level, the excitation current, which was stored as magnetic energy at the coil 9, is stored in the condenser $C_2$ of the second energy storing section 16 as electric energy through the diode $D_{16}$, and current starts to flow through the coil 10.

In this state, if the switching signal applied to the N-MOS transistor $M_{14}$ is shifted from high level state to low level state or vice versa, the N-MOS transistor $M_{14}$ is switched according to the switching signal.

While the N-MOS transistor $M_{14}$ is being turned on the current flowing through the coil 9 circulates in a closed loop through the diode $D_{16}$, so that the current in the coil 9 decreases very slowly. Meanwhile, while the N-MOS transistor $M_{14}$ is being turned off, the current flowing through the coil 9 decreased quickly because it is stored in the condenser $C_2$ through the diode $D_{20}$.

If the duty of the PWM signal is large, the duration that the N-MOS transistor is turned on is prolonged, and thereby the current is decreased slowly, while if the duty of the PWM signal is small, the duration that the N-MOS transistor is turned off is prolonged, and thereby the current is decreased quickly.

Therefore, the larger the duty of the PWM signal is, the shorter the duration that the current of the coil 9 increases is. This is because the current in the coil 9 is decreased very slowly.

Furthermore, when the quick stopping of the motor is required, it can be achieved by inverse-phase braking. And, noise and vibration of the motor can be reduced by controlling the duty of the PWM signal to supply a proper wave form of the current to the system.

What is claimed is:

1. A switched reluctance motor driving circuit, comprising:

first switching means for performing switching operation by receiving a predetermined electric signal;

magnetic flux generating means for generating the magnetic flux according to the operation of the first switching means;

a diode array for transmitting the excitation current which flows through the magnetic flux generating means in one direction;

first energy storing means for accumulating the excitation current which passed through the diode array as electric energy;

energy conversion means for receiving the electric energy stored in the first energy storing means and converting it to magnetic energy;

second switching means for controlling the operation of the energy conversion means; and second energy storing means for storing the output of the energy conversion means as electric energy;

wherein said first energy storing means comprise a capacitor; and wherein said energy conversion means comprise an inductive coupling circuit and a diode.

2. A switched reluctance motor driving circuit as claimed in claim 1, wherein said second switching means comprise a switching element.

3. A switched reluctance motor driving circuit as claimed in claim 2, wherein said switching element is a transistor or a MOS transistor.

4. A switched reluctance motor driving circuit as claimed in claim 2, wherein a part of the energy of the capacitor of the first energy storing means is induced from first windings to second windings of the reluctance motor when said switching element is turned on.

5. A switched reluctance motor driving circuit, comprising:

first switching means for performing switching operation by receiving a predetermined electric signal;

magnetic flux generating means for generating the magnetic flux according to the operation of the first switching means;

a diode array for transmitting the excitation current which flows through the magnetic flux generating means in one direction;

first energy storing means for accumulating the excitation current which passed through the diode array as electric energy;

energy conversion means for receiving the electric energy stored in the first energy storing means and converting it to magnetic energy;

second switching means for controlling the operation of the energy conversion means;

second energy storing means for storing the output of the energy conversion means as electric energy; and frequency modulation means for controlling switching of the second switching means; and wherein said frequency modulation means receive a control signal and a brake signal to perform logical sum with respect to them.

6. A switched reluctance motor driving circuit, comprising:

first switching means for performing switching operation by receiving a predetermined electric signal;

magnetic flux generating means for generating the magnetic flux according to the operation of the first switching means;

a diode array for transmitting the excitation current which flows through the magnetic flux generating means in one direction;

first energy storing means for accumulating the excitation current which passed through the diode array as electric energy;

energy conversion means for receiving the electric energy stored in the first energy storing means and converting it to magnetic energy;

second switching means for controlling the operation of the energy conversion means;

second energy storing means for storing the output of the energy conversion means as electric energy; and frequency modulation means for controlling switching of the second switching means;

wherein said frequency modulation means comprise: a comparator for detecting the output current of the second switching means to compare it with a reference signal; means for receiving the output of said comparator and a brake signal means for performing logical product with respect to them; and means for receiving the output of said means for performing logical product and a control signal to perform logical sum with respect to them.

7. A switched reluctance motor driving circuit as claimed in claim 6, wherein an inverse-phase braking is possible by making the brake signal to be in high level at a brake point.

8. A switched reluctance motor driving circuit as claimed in claim 7, wherein the frequency of the control signal is lowered gradually at the brake point in the inverse-phase braking.

9. A switched reluctance motor driving circuit as claimed in claim 7, wherein the duty of the control signal is increased at the brake point in the inverse-phase braking.

10. A switched reluctance motor driving circuit, comprising:

first switching means for performing switching operation by receiving a predetermined electric signal;

magnetic flux generating means for generating the magnetic flux according to the operation of the first switching means;

a diode array for transmitting the excitation current which flows through the magnetic flux generating means in one direction;

first energy storing means for accumulating the excitation current which passed through the diode array as electric energy;

energy conversion means for receiving the electric energy stored in the first energy storing means and converting it to magnetic energy;

second switching means for controlling the operation of the energy conversion means;

second energy storing means for storing the output of the energy conversion means as electric energy;

control means for receiving a predetermined electric signal to generate a switching signal;

third switching means for switching according to the switching signal outputted from said control means;

inverse-flow preventing means for preventing the energy of the first energy storing means from flowing inversely when the third switching means are driven.

11. A switched reluctance motor driving circuit as claimed in claim 10, wherein said control means comprise:

descending edge detecting means for receiving the respective pairs of electric signal to detect the descending edge;

means for receiving the output of said descending edge detecting means for performing logical sum;

level shifting means for leveling up the output of the means for performing logical sum;

pulse width modulation signal generating means for generating a pulse width modulation signal; and means for receiving the output of said level shifting means and the output of said pulse width modulation signal generating means to perform logical product with respect to them.

12. A switched reluctance motor driving circuit as claimed in claim 11, wherein said descending edge detecting means generate a signal having a predetermined width at the descending edge of the respective pairs of the electrical signal.

13. A switched reluctance motor driving circuit as claimed in claim 12, wherein said predetermined width is much larger than the width of said pulse width modulation signal.

14. A switched reluctance motor driving circuit as claimed in claim 11, wherein said level shifting means are a photo coupler, a pulse transformer, or a level shifter.

15. A switched reluctance motor driving circuit as claimed in claim 11, wherein the shape of the current flowing through the magnetic flux generating means can be changed by controlling the duty of said pulse width modulation signal.

16. A switched reluctance motor driving circuit as claimed in claim 15, wherein the shape of the current is similar to a rectangle when said duty is about 50%.

17. A switched reluctance motor driving circuit as claimed in claim 10, wherein said inverse-flow preventing means comprise a diode.

18. A switched reluctance motor driving circuit as claimed in claim 10, wherein said third switching means comprise a switching element.

19. A switched reluctance motor driving circuit as claimed in claim 18, wherein said switching element of said third switching means is a transistor or a MOS transistor.

* * * * *